United States Patent
Oesterreich

Patent Number: 5,566,497
Date of Patent: Oct. 22, 1996

[54] SOUND PRODUCING FISHING LURE

[76] Inventor: Gerald W. Oesterreich, 5071 S. 68th St., Greenfield, Wis. 53220

[21] Appl. No.: 351,626

[22] Filed: Dec. 8, 1994

[51] Int. Cl.$^6$ .......................... A01K 85/01; A01K 85/12
[52] U.S. Cl. .................. 43/42.16; 43/42.15; 43/42.31
[58] Field of Search .................... 43/42.11, 42.15, 43/42.16, 42.31, 42.19, 42.36

[56] References Cited

U.S. PATENT DOCUMENTS

| | | | |
|---|---|---|---|
| 661,869 | 11/1900 | Henkenius | 43/42.16 |
| 974,050 | 10/1910 | Garrison | 43/42.16 |
| 1,155,883 | 10/1915 | Burkman | 43/42.16 |
| 1,474,823 | 11/1923 | Hines | 43/42.16 |
| 1,521,090 | 12/1924 | Goble | 43/26.2 |
| 2,501,428 | 5/1947 | Woodle | 43/42.31 |
| 2,527,468 | 10/1950 | Turner | 43/42.26 |
| 2,612,717 | 10/1952 | Kuehnel | 43/42.14 |
| 2,653,408 | 9/1953 | Bradley | 43/42.12 |
| 2,967,371 | 1/1961 | Strong | 43/42.74 |
| 3,012,357 | 12/1961 | Helin | 43/42.17 |
| 3,112,576 | 6/1962 | Tay | 43/42.14 |
| 3,172,227 | 3/1965 | Mackey | 43/42.09 |
| 3,183,620 | 5/1964 | Dockal | 43/42.74 |
| 3,279,117 | 10/1966 | Weimer | 43/42.15 |
| 3,367,059 | 2/1968 | Puls et al. | 43/42.14 |
| 3,530,612 | 9/1970 | Garrison | 43/42.16 |
| 4,135,323 | 1/1979 | Esten | 43/42.16 |
| 4,416,080 | 11/1983 | Morrissette | 43/42.2 |
| 4,435,914 | 3/1984 | Norman | 43/42.12 |
| 4,569,147 | 2/1986 | Margulis | 43/26.2 |
| 4,619,067 | 10/1986 | West | 43/42.09 |
| 4,619,068 | 10/1986 | Wotawa | 43/42.11 |
| 4,641,455 | 2/1987 | Johnson | 43/42.13 |
| 4,679,347 | 7/1987 | Stirtz | 43/43.1 |
| 4,793,089 | 12/1988 | Long et al. | 43/42.13 |
| 4,823,500 | 4/1989 | Shindeldecker | 43/42.13 |
| 4,823,501 | 4/1989 | Standish, Jr. | 43/42.31 |
| 4,823,503 | 4/1989 | Tesch | 43/42.04 |
| 4,984,950 | 1/1991 | Streed | 43/42.13 |
| 5,050,334 | 9/1991 | Standish, Jr. | 43/42.13 |
| 5,084,996 | 2/1992 | Woodruff et al. | 43/42.33 |
| 5,084,997 | 2/1992 | DiPaola | 43/42.53 |
| 5,084,998 | 2/1992 | Dixon | 43/43.16 |
| 5,144,765 | 9/1992 | Keeton | 43/42.31 |
| 5,201,784 | 4/1993 | McWilliams | 43/42.31 |
| 5,253,446 | 10/1993 | Ogle | 43/42.13 |

Primary Examiner—J. Elpel
Attorney, Agent, or Firm—Charles F. Meroni, Jr.

[57] ABSTRACT

A sound producing and splash generating fishing lure is provided. The fishing lure comprises an elongated head portion having a first axial bore extending axially for rotational securement of the of the elongated head portion to a front portion of a wire shaft. An elongated body portion is provided having a second axial bore extending axially for securement of the elongated body portion to a back portion of the wire shaft. A blade having radially extending curved blade ends is variably secured to a back side of the elongated head portion for rotational movement with the elongated head portion to produce a variable amount of clicking sound caused by vibratory action of the blade when the fishing lure is drawn through water. The wire shaft has a front end and a back end, the front end being adapted for connection of the shaft to a line, the back end being adapted for connection of the shaft to a hook.

20 Claims, 2 Drawing Sheets

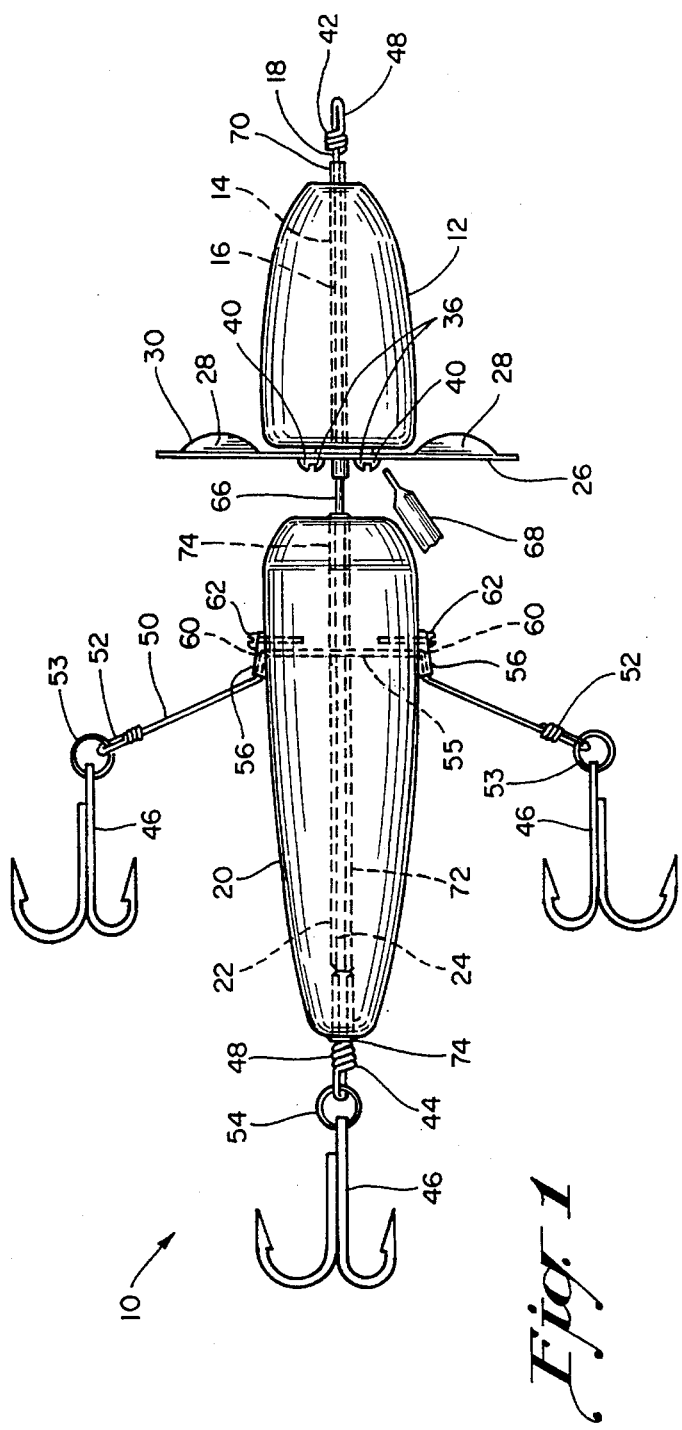
Fig. 1
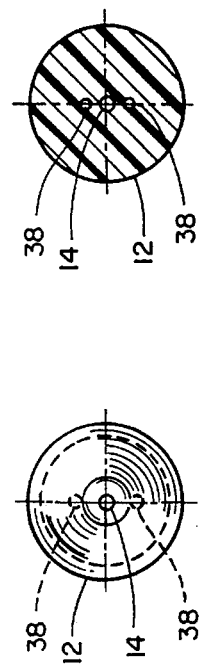
Fig. 3
Fig. 4
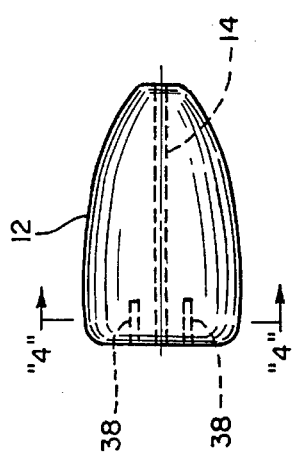
Fig. 2

SOUND PRODUCING FISHING LURE

BACKGROUND OF THE INVENTION

1. Field of the Invention

The present invention relates generally to a fishing lure. More particularly, the invention pertains to a multi-sectional sound producing and splash generating fishing lure which is attached to a fishing line and adapted for use across a water surface.

2. Description of the Prior Art

In the art of fishing lures, the advantages of fishing lures capable of attracting fish by the use of a rotating member which produces a splashing or vibrational effect has long been known. For example, U.S. Pat. No. 2,653,408 issued to Bradley discloses a fishing lure having a propeller member mounted for rotation about a longitudinal axis. U.S. Pat. No. 3,012,357 issued to Helin discloses a fishing lure having a rotary blade mounted on a forward most end of a fish lure body. U.S. Pat. No. 3,367,059 issued to Puls provides a jointed sectional fishing lure having propellers secured to a cylindrical periphery of a center sectional portion of the fishing lure.

While these devices serve to provide satisfactory fishing lures that are more attractive to fish, a fishing lure for use with large game or sport fish, such as muskellunge, that could produce both a splashing effect and a clicking noise is highly desirous.

As will be described in greater detail hereinafter, the fishing lure of the present invention differs from those previously proposed.

SUMMARY OF THE INVENTION

Accordingly, it is an object of this invention to provide a fishing lure for use across the surface of the water which produces a lifelike action for attracting fish.

Another object of this invention is to provide a fishing lure having a dual fish attracting action of splash generating and sound producing.

Still another object of this invention is to provide a sound producing fishing lure capable of producing a variable amount of a metal clicking sound that can be easily adjusted by a fisherman.

Yet another object of this invention is to provide a fishing lure having hooks which are free from entanglement with one another.

Yet still another object of this invention is to provide a fishing lure which is suitable for catching large game fish such as muskellunge.

To achieve the foregoing and other objectives, and in accordance with the purposes of the present invention a fishing lure is provided. The fishing lure comprises an elongated head portion having a first axial bore extending axially for rotational securement of the of the elongated head portion to a front portion of a wire shaft. An elongated body portion is provided having a second axial bore extending axially for securement of the elongated body portion to a back portion of the wire shaft. A blade having radially extending curved blade ends is variably secured to a back side of the elongated head portion for rotational movement with the elongated head portion to produce a variable amount of clicking sound caused by vibratory action of the blade when the fishing lure is drawn through water. The wire shaft has a front end and a back end, the front end being adapted for connection of the shaft to a line, the back end being adapted for connection of the shaft to a hook.

In accordance with an aspect of the invention, a wire hook hanger is provided. The wire hook hanger is connected to the elongated body portion. The wire hook hanger has eyelet ends extended in a spaced apart relationship from the elongated body portion so that hooks operatively connected to the eyelet ends are free from entanglement with one another.

In accordance with another aspect of the invention, the blade secured to the back side of the elongated head portion comprises a pair of screw holes approximately positioned on opposite sides of a wire shaft hole of the blade. A pair of screws extend through the screw holes and into the elongated head portion, the screws having screw heads with the screw heads being in a spaced apart adjustable relationship from the back side of the elongated head portion so that a clicking sound will be caused by vibratory action of the blade intermittently striking the screws when the fishing lure is drawn through water causing the curved blade ends to rotate.

In accordance with yet another aspect of the invention, the wire shaft hole is positioned in an off-centered location of the blade for producing unbalanced rotation of the blade. The screw holes are positioned nonlinear with the wire shaft hole for producing increased vibratory action and splashing when the fishing lure is drawn through water.

Other objects, features and advantages of the invention will become more readily apparent upon reference to the following description when taken in conjunction with the accompanying drawings, which drawings illustrate several embodiments of the invention.

BRIEF DESCRIPTION OF THE DRAWINGS

In the drawings:

FIG. 1 is a side elevational view of the fishing lure of the present invention;

FIG. 2 is a side elevational view of the elongated head portion of the present invention;

FIG. 3 is an end elevational view of the elongated head portion of the present invention;

FIG. 4 is an end sectional view of the elongated body portion of the present invention;

DETAILED DESCRIPTION OF THE PREFERRED EMBODIMENT

Figure 5:
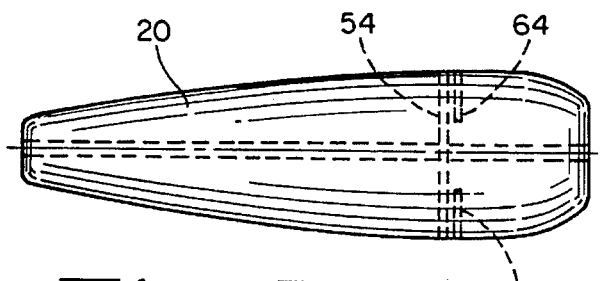
FIG. 5 is a side elevational view of the elongated body portion of the present invention.

Referring now to the drawings, a variable sound producing and splash generating fishing lure is indicated generally by the numeral 10 in FIG. 1. The fishing lure 10 is a multi-sectional surface lure and comprises an elongated head portion 12 having a first axial bore 14 extending axially for rotational securement of the of the elongated head portion 12 to a front portion 1 of a wire shaft 18, as best illustrated in FIGS. 1–3. In an alternative embodiment, the first axial bore 14 may be extended axially off-centered from the longitudinal axis of the elongated head portion 12 to produce an unbalanced rotation of the elongated head portion, 12 about the wire shaft 18. The elongated head portion has a circular cross-section and his a forwardly tapering conical shape.

Figure 7:
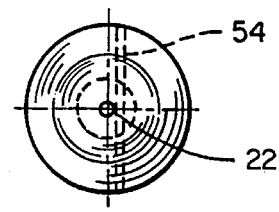
FIG. 7 is an end elevational view of the elongated body portion of the present invention.
Figure 6:
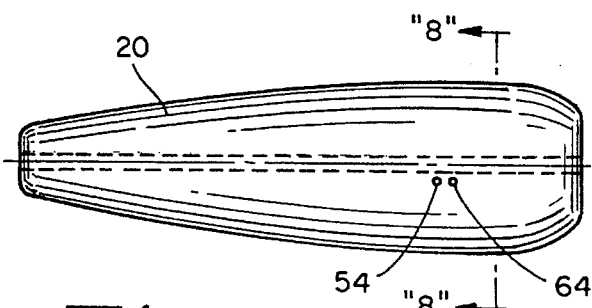
FIG. 6 is a side elevational view of the elongated body portion of the present invention.
Figure 8:
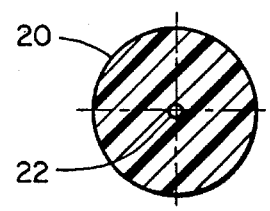
FIG. 8 is an end sectional view of the elongated body portion of the present invention.

An elongated body portion 20 is provided having a second axial bore 22 extending axially for securement of the elongated body portion 20 to a back portion 24 of the wire shaft 18. The elongated body portion 20 has a circular cross-section, as best illustrated in FIGS. 7 and 8, arid a backwardly tapering conical shape.

The elongated head portion 12 and elongated body portion 20 are formed from a buoyant material such as wood. Preferably, poplar wood is used because poplar wood is harder than other woods, such as cedar, thereby lessening the chances that a large game fish, such as muskellunge, will be able to sink it's teeth into the wood.

Figure 9:
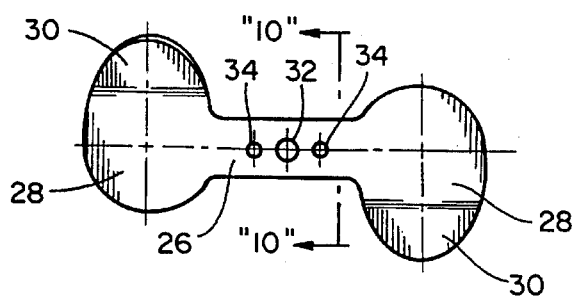
FIG. 9 is a side elevational view of the blade of the present invention.
Figure 10:
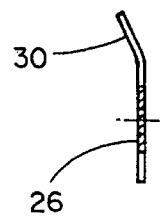
FIG. 10 is an end elevational view of the blade of the present invention.

As best illustrated in FIG. 9, a blade 26 having radially extending splash producing curved blade ends 28 is provided. Preferably, the curved blade ends 28 are egg or cam shaped or semi-elliptically shaped. The curved bladed ends 28 have a curved or bent portion 30, as best shown in FIG. 10, for cupping water as the fishing lure 10 is drawn through the water to allow the blade 26 to rotate. Preferably, the bent portion 30 is bent approximately 20 to 25 degrees away from the blade 26. The use of the semi-elliptically shaped blade ends in combination with the bent portion 30 produces a superior water cupping or throwing ability over a conventional round shape. The blade 26 has a wire shaft hole 32 for insertion of the wire shaft 18 therethrough. A pair of screw holes 34 are provided through the blade 26 approximately positioned on opposite sides of the wire shaft hole 32. Preferably, the blade 26 is formed from a 16 gauge stainless steel so that it is durable and non-corrosive.

The blade 26 is adjustably or variably mounted to a back side of the elongated head portion 12 for rotational movement with the elongated head portion 12. The blade 26 is preferably secured with a pair of screws 36 extending through the screw holes 34 and into threaded engagement, with elongated head portion bores 38 of the elongated head portion 12. The screws 36 has screw heads 40 with the screw heads 40 being in a spaced apart adjustable relationship from the back side of the elongated head portion 12 so that a metal clicking sound will be caused by vibratory action of the blade 26 intermittently striking the screws 36 when the fishing lure is drawn through water causing the splash generating curved blade ends to rotate. The use of a wire shaft hole 32 and screw holes 34 having a diameter generally larger that the respective wire shaft 18 or screws 36 inserted through will allow for the lateral movement necessary to create the metal clicking vibratory action.

Figure 11:
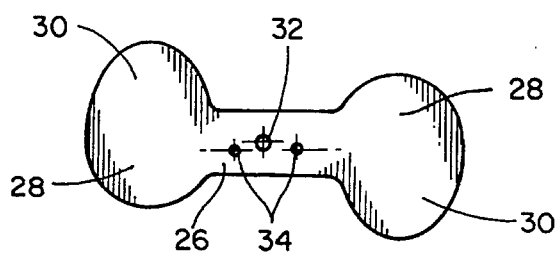
FIG. 11 is a side elevational view of an alternative embodiment of the blade of the present invention.

In an alternative embodiment of the blade 26 shown in FIG. 11, it has been found that improved vibratory action and splashing can be achieved if the wire shaft hole 32 is positioned in an off-centered location of the blade 26 for producing unbalanced rotation of the blade 26. In addition, the screw holes 34 are positioned nonlinear with the wire shaft hole 32. In a preferred embodiment, the off-centered location of the blade 26 is positioned in the direction of the axially off-centered first axial bore 14 of the elongated head portion 12, shown in FIG. 3, to produce an increased eccentric motion.

Referring to FIG. 1, the wire shaft 18 has a front end 42 and a back end 44 and is formed from a resilient metal wire. The front end 42 being adapted for connection of the shaft to a fishing line. The back end being adapted for connection of the shaft to a treble or gang hook 46. Preferably, the front end 42 and back end 44 are twisted to form an eyelet opening 48 which also serves to hold the elongated head portion 12 and elongated body portion 20 in place on the wire shaft 18. A metal circular split ring 53 may be used to interconnect the eyelet opening 48 with the hook 46.

A wire hook hanger 50 formed of resilient metal wire is provided. The wire hook hanger 50 is connected to the elongated body portion 20. The wire hook hanger 50 has eyelet ends 52 extended in a s paced apart relationship from the elongated body portion 20 so that hooks 46 may be operatively connected to the eyelet ends 52 which are free from entanglement with one another. A metal circular split ring 53 is preferably used to interconnect the eyelet ends 52 with the hooks 46.

Preferably, the elongated body portion 20 has a wire hook hanger bore 54 approximately perpendicular to the second axial bore 22 for securement of the wire hook hanger 50 therethrough. A pair of hook hanger brackets 56 are secured to an outside surface 58 of the elongated body portion 20 over opposite ends of wire hook hanger bore openings 60 of the wire hook hanger bore 54 in the elongated body portion 20. The wire hook hanger bore 54 has a brass tube 55 inserted within to add support for the wire hook hanger 50 and to prevent wearing of the elongated body portion 20. The brass tube 55 may be secured with an adhesive of any suitable type. The hook hanger brackets 56 are preferably secured to the elongated body portion 20 with small screws 62 that threadingly engage small bores 64 formed in the elongated body portion 20, as best shown in FIG. 5. Preferably, the wire hook hanger 50 extends from the elongated body portion 20 at an angle of 60 to 70 degrees.

A metal spherical bead 66 is rotationally secured to the wire shaft 18 between the elongated head portion 12 and the elongated body portion 20 which serves to reduce friction for the rotating blade 26, as well as provide for an additional gap between the elongated head portion 12 and elongated body portion 20. This gap allows for space needed to be able to adjust or vary the engagement of the screws 36 into the elongated head portion bores 38 with a screwdriver 68. Increasing the spaced apart distance of the screw heads 40 from the elongated head portion 12 will increase the moveability of the blade 26 and enhance the vibratory action of the blade 26 in conjunction with the screws 36 when the fishing lure is drawn through water.

A first elongated tube 70 formed of metal, such as brass, is secured within the first axial bore 14 the elongated head portion. The elongated tube 70 reduces friction between the rotating elongated head portion 12 and the wire shaft 18, as well as protecting the elongated head portion 12 from wear. A second elongated tube 72 formed of plastic is secured within the second axial bore 22 of the elongated body portion with brass eyelets 74 secured within opposite ends of the second axial bore 22 for engagement with the wire shaft 18.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A sound producing fishing lure comprising:
   (a) an elongated head portion having a first axial bore extending axially for rotational securement of the elongated head portion to a front portion of a wire shaft;
   (b) an elongated body portion having a second axial bore extending axially for securement of the elongated body portion to a back portion of the wire shaft;
   (c) a blade having radially extending curved blade ends, the blade having a wire shaft hole for insertion of the wire shaft therethrough, the wire shaft hole being positioned in an off-centered location of the blade for producing unbalanced rotation of the blade;
   (d) means for loosely securing the blade to a back side of the elongated head portion for movement relative to the elongated head portion while rotating with the elongated head portion to produce a variable amount of clicking sound caused by vibratory action of the blade intermittently striking the means for loosely securing when the fishing lure is drawn through water; and
   (e) the wire shaft having a front end and a back end, the front end having means for connection of the shaft to a line, the back end having means for connection of the shaft to a hook.

2. The fishing lure of claim 1, further comprising a wire hook hanger connected to the elongated body portion, the wire hook hanger having eyelet ends extended in a spaced apart relationship from the elongated portion.

3. The fishing lure of claim 2, wherein the elongated body portion has a wire hook hanger bore approximately perpendicular to the second axial bore for securement of the wire hook hanger therethrough.

4. The fishing lure of claim 3, further comprising a pair of hook hanger brackets secured to an outside surface of the elongated body portion on opposite ends of wire hook hanger bore openings of the elongated body portion.

5. The fishing lure of claim 2, further comprising hooks operatively connected to the eyelet ends.

6. The fishing lure of claim 1, wherein the curved blade ends are cam shaped.

7. The fishing lure of claim 7, wherein the blade has a wire shaft hole for insertion of the wire shaft therethrough.

8. The fishing lure of claim 7, wherein the means for securing the blade to a back side of the elongated head portion comprises a pair of screw holes approximately positioned on opposite sides f the wire shaft hole, a pair of screws extending through the screw holes and into the elongated head portion, the screws having screw heads with the screw heads being in a space, apart adjustable relationship from the back side of the elongated head portion so that the clicking sound will be caused by vibratory action of the blade intermittently striking the screws when the fishing lure is drawn through water causing the curved blade end to rotate.

9. The fishing lure of claim 1, further comprising a spherical bead rotationally secured to the wire shaft between the elongated head portion and the elongated body portion.

10. The fishing lure of claim 1, further comprising a first elongated tube secured within the first axial bore of the elongated head portion.

11. A sound producing fishing lure comprising:
   (a) an elongated head portion having a first axial bore extending axially for rotational securement of the elongated head portion to a front portion of a wire shaft;
   (b) an elongated body portion having a second axial bore extending axially for securement of the elongated body portion to a back portion of the wire shaft;
   (c) a blade having radially extending splash producing curved blade ends, the blade having a wire shaft hole for insertion of the wire shaft therethrough and a pair of screw holes approximately positioned on opposite sides of the wire shaft hole, the wire shaft hole being positioned in an off-centered location of the blade for producing unbalanced rotation of the blade;
   (d) a pair of screws extending through the screw holes and into the elongated head portion, the screws heads with the screw heads being in a spaced apart adjustable relationship from the back side of the elongated head portion so that the blade can move on the screws relative to the elongated head portion to generate a clicking sound will be caused by vibratory action of the blade intermittently striking the screws when the fishing lure is drawn through water causing the curved blade ends to rotate; and
   (e) the wire shaft having a front end and a back end, the front end having means for connection of the shaft to a line, the back end having means for connection of the shaft to a hook.

12. The fishing lure of claim 11, further comprising a wire hook hanger connected to the elongated body portion, the wire hook hanger having eyelet ends extended in a spaced apart relationship from the elongated body portion so that hooks operatively connected to the eyelet ends are free from entanglement with one another.

13. The fishing lure of claim 11, wherein the splash producing curved blade ends are cam shaped.

14. The fishing lure of claim 11, further comprising a spherical bead rotationally secured to the wire shaft between the elongated head portion and the elongated body portion and a first elongated tube secured within the first axial bore of the elongated head portion.

15. A variable sound producing and splash generating fishing lure, comprising in combination:
   (a) an elongated head portion having a first axial bore extending axially for rotational securement of the elongated head portion to a front portion of a wire shaft;
   (b) an elongated body portion having a second axial bore extending axially for securement of the elongated body portion to a back portion of the wire shaft;
   (c) a blade having radially extending splash producing curved blade ends, the blade having a wire shaft hole for insertion of the wire shaft therethrough, the wire shaft hole being positioned in an off-centered location of the blade for producing unbalanced rotation of the blade;
   (d) means for loosely securing the blade to a back side of the elongated head portion for movement relative to the elongated head portion while rotating with the elongated head portion to produce a variable amount of clicking sound caused by vibratory action of the blade intermittently striking the means for loosely securing when the fishing lure is drawn through water;
   (e) the wire shaft having a front end and a back end, the front end having means for connection of the shaft to a line, the back end having means for connection of the shaft to a hook; and
   (f) a wire hook hanger connected to the elongated body portion, the wire hook hanger having eyelet ends extended in a spaced apart relationship from the elongated body portion so that hooks operatively connected to the eyelet ends are free from entanglement with one another.

16. The combination of claim 15, wherein the means for securing the blade to a back side of the elongated head portion comprises a pair of screw holes, a pair of screws extending through the screw holes and into the elongated head portion, the screws having screw heads with the screw heads being in a spaced apart adjustable relationship from the back side of the elongated head portion so that the clicking sound will be caused by vibratory action of the blade intermittently striking the screws when the fishing lure is drawn through water causing the curved blade ends to rotate.

17. The combination of claim 15, wherein the splash producing curved blade ends are cam shaped.

18. A fishing lure comprising:
  (a) an elongated head portion having a first axial bore extending axially for rotational securement of the elongated head portion to a front portion of a wire shaft;
  (b) an elongated body portion having a second axial bore extending axially for securement of the elongated body portion to a back portion of the wire shaft;
  (c) a blade having radially extending curved blade ends, the blade having a wire shaft hole for insertion of the wire shaft therethrough;
  (d) means for securing the blade to a back side of the elongated head portion for rotational movement with the elongated head portion to produce a variable amount of clicking sound caused by vibratory action of the blade intermittently striking the means for securing when the fishing lure is drawn through water;
  (e) the wire shaft having a front end and a back end, the front end having means for connection of the shaft to a line, the back end having means for connection of the shaft to a hook;
  (f) the means for securing the blade to a back side of the elongated head portion comprises a pair of screw holes approximately positioned on opposite sides of the wire shaft hole, a pair of screws extending through the screw holes and into the elongated head portion, the screws having screw heads with the screw heads being in a spaced apart adjustable relationship from the back side of the elongated head portion so that a clicking sound will be caused by vibratory action of the made intermittently striking the screws when the fishing lure is drawn through water causing the curved blade ends to rotate; and,
  (g) the wire shaft hole is positioned in an off-centered location of the blade for producing unbalanced rotation of the blade, and the screw holes are positioned nonlinear with the wire shaft hole for producing increased vibratory action and splashing when the fishing lure is drawn through water.

19. A fishing lure comprising:
  (a) an elongated head portion having a first axial bore extending axially for rotational securement of the elongated head portion to a front portion of a wire shaft;
  (b) an elongated body portion having a second axial bore extending axially for securement of the elongated body portion to a back portion of the wire shaft;
  (c) a blade having radially extending splash producing curved blade ends, the blade having a wire shaft hole for insertion of the wire shaft therethrough and a pair of screw holes approximately positioned on opposite sides of the wire shaft hole;
  (d) a pair of screws extending through the screw holes and into the elongated head portion, the screws having screw heads with the screw heads being in a spaced apart adjustable relationship from the back side of the elongated head portion so that a clicking sound will be caused by vibratory action of the blade intermittently striking the screws when the fishing lure is drawn through water causing the curved blade ends to rotate;
  (e) the wire shaft having a front end and a back end, the front end having means for connection of the shaft to a line, the back end having means for connection of the shaft to a hook; and,
  (f) the wire shaft hole is positioned in an off-centered location of the blade for producing unbalanced rotation of the blade, and the screw holes are positioned nonlinear with the wire shaft hole for producing increased vibratory action and splashing when the fishing lure is drawn through water.

20. A variable sound producing and splash generating fishing lure, comprising in combination:
  (a) an elongated head portion having a first axial bore extending axially for rotational securement of the elongated head portion to a front portion of a wire shaft;
  (b) an elongated body portion having a second axial bore extending axially for securement of the elongated body portion to a back portion of the wire shaft;
  (c) a blade having radially extending splash producing curved blade ends, the blade having a wire shaft hole for insertion of the wire shaft therethrough;
  (d) means for securing the blade to a back side of the elongated head portion for rotational movement with the elongated head portion to produce a variable amount of clicking sound caused by vibratory action of the blade intermittently striking the means for securing when the fishing lure is drawn through water;
  (e) the wire shaft having a front end and a back end, the from end having means for connection of the shaft to a line, the back end having means for connection of the shaft to a hook;
  (f) a wire hook hanger connected to the elongated body portion, the wire hook hanger having eyelet ends extended in a spaced apart relationship from the elongated body portion so that hooks operatively connected to the eyelet ends are free from entanglement with one another;
  (g) the means for securing the blade to a back side of the elongated head portion comprises a pair of screw holes approximately positioned on opposite sides of the wire shaft hole, a pair of screws extending through the screw holes and into the elongated head portion, the screws having screw heads with the screw heads being in a spaced apart adjustable relationship from the back side of the elongated head portion so that a clicking sound will be caused by vibratory action of the blade intermittently striking the screws when the fishing lure is drawn through water causing the curved blade ends to rotate; and,
  (h) the wire shaft hole is positioned in an off-centered location of the blade for producing unbalanced rotation of the blade, and the screw holes are positioned nonlinear with the wire shaft hole for producing increased vibratory action and splashing when the fishing lure is drawn through water.

* * * * *